United States Patent
Park et al.

(10) Patent No.: US 9,975,557 B2
(45) Date of Patent: May 22, 2018

(54) METHOD OF CONTROLLING ELECTRIC VEHICLE TRANSMISSION

(71) Applicants: Hyundai Motor Company, Seoul (KR); Research & Business Foundation SUNGKYUNKWAN UNIVERSITY, Suwon-si, Gyeonggi-do (KR)

(72) Inventors: Jong Yun Park, Hwaseong-si (KR); Kyung Ha Kim, Yongin-si (KR); Jae Young Choi, Busan (KR); Yeon Ho Kim, Suwon-si (KR); Sung Wha Hong, Hwaseong-si (KR)

(73) Assignees: HYUNDAI MOTOR COMPANY, Seoul (KR); RESEARCH & BUSINESS FOUNDATION SUNGKYUNKWAN UNIVERSITY, Suwon-si, Gyeonggi-Do (KR)

( * ) Notice: Subject to any disclaimer, the term of this patent is extended or adjusted under 35 U.S.C. 154(b) by 268 days.

(21) Appl. No.: 15/144,508

(22) Filed: May 2, 2016

(65) Prior Publication Data
US 2017/0166208 A1    Jun. 15, 2017

(30) Foreign Application Priority Data
Dec. 11, 2015 (KR) .......................... 10-2015-0177034

(51) Int. Cl.
*B60W 30/19* (2012.01)
*B60W 10/08* (2006.01)
(Continued)

(52) U.S. Cl.
CPC ............ *B60W 30/19* (2013.01); *B60W 10/08* (2013.01); *B60W 10/11* (2013.01);
(Continued)

(58) Field of Classification Search
CPC ...... B60W 10/08; B60W 10/11; B60W 30/19; B60W 30/188; F16H 61/04; F16H 2061/0429; F16H 2061/0433
See application file for complete search history.

(56) References Cited

U.S. PATENT DOCUMENTS 8,262,538 B2 * 9/2012 Borntraeger ............ F16H 3/126
477/15
9,068,636 B2 * 6/2015 Dittrich ................. F16H 37/042
(Continued)

FOREIGN PATENT DOCUMENTS

JP    H08-168110 A    6/1996
JP    2009-121591 A    6/2009
(Continued)

*Primary Examiner* — Erin D Bishop
(74) *Attorney, Agent, or Firm* — Brinks Gilson & Lione

(57) ABSTRACT

A method of controlling an electric vehicle transmission includes: a torque-securing step of securing a predetermined spare torque to be generated by a motor in accordance with a current motor torque when a controller determines that there is a need for downshift from an upper gear step to a lower gear step; a slip-controlling step of generating a friction force through a servo clutch applying a friction force between an input shaft and a servo driving gear of a pair of servo gears; a shifting-to-neutral step of shifting to a neutral gear by disengaging a synchronizer for the upper gear step; a motor-synchronizing step of synchronizing a rotational speed of the motor with a desired speed of a lower gear step using the spare torque of the motor secured in the torque-securing step; a gear-engaging step of engaging a synchronizer for the lower gear step; and a clutch-disengaging step of finishing shifting by disengaging the servo clutch.

6 Claims, 4 Drawing Sheets

(51) Int. Cl.
*B60W 10/11* (2012.01)
*B60W 30/188* (2012.01)
*F16H 61/04* (2006.01)

(52) U.S. Cl.
CPC .......... *B60W 30/188* (2013.01); *F16H 61/04* (2013.01); *B60W 2510/083* (2013.01); *B60W 2710/081* (2013.01); *B60W 2710/1005* (2013.01); *F16H 2061/0429* (2013.01)

(56) References Cited

U.S. PATENT DOCUMENTS

2008/0254932 A1    10/2008  Heinzelmann
2009/0272211 A1*  11/2009  Hoffmann ............ F16H 37/042
                                                                     74/325
2012/0216638 A1     8/2012  Pritchard et al.

FOREIGN PATENT DOCUMENTS

| JP | 2011-235817 A | 11/2011 |
|----|---------------|---------|
| KR | 10-1999-0004984 A | 1/1999 |
| KR | 10-2011-0119902 A | 11/2011 |
| KR | 10-2012-0031612 | 4/2012 |
| KR | 10-2012-0055335 | 5/2012 |
| KR | 10-2013-0115618 | 10/2013 |

* cited by examiner

FIG. 3A
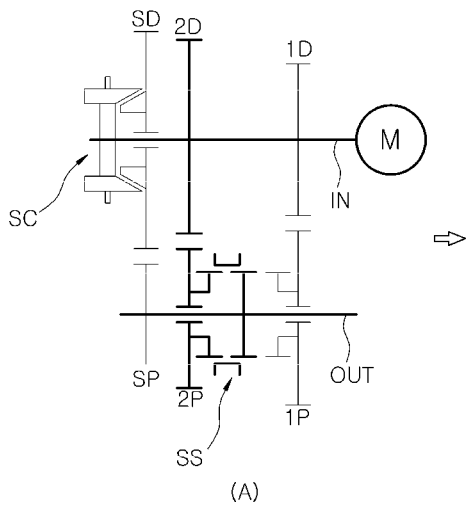
(A)
FIG. 3B
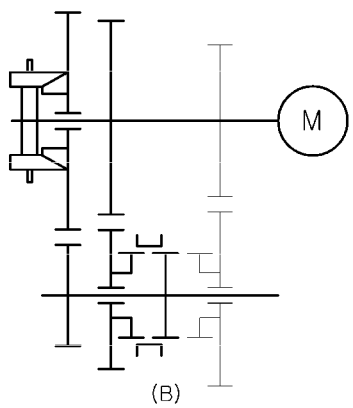
(B)
FIG. 3C
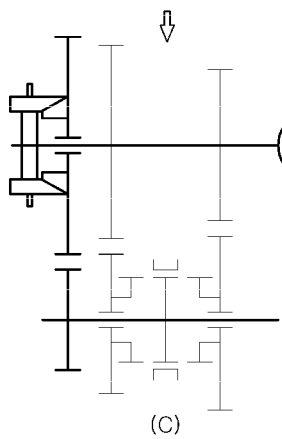
(C)
FIG. 3E
(E)
FIG. 3D
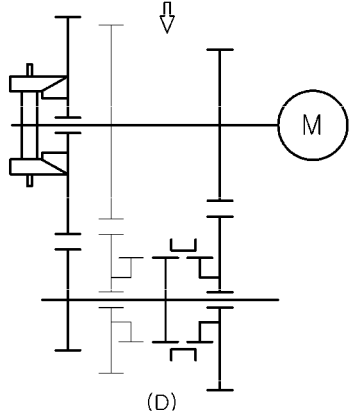
(D)

METHOD OF CONTROLLING ELECTRIC VEHICLE TRANSMISSION

CROSS REFERENCE TO RELATED APPLICATION

The present application claims priority to and the benefit of Korean Patent Application No. 10-2015-0177034, filed Dec. 11, 2015, which is incorporated by reference in its entirety.

FIELD

The present disclosure relate to a method of controlling an electric vehicle transmission.

BACKGROUND

The statements in this section merely provide background information related to the present disclosure and may not constitute prior art.

An electric vehicle is equipped with a transmission that can shift power from a motor to reduce the manufacturing cost by decreasing the capacity of a motor.

As described above, it is desired that a transmission for an electric vehicle has a relatively simple configuration, so a synchromesh type of shifting mechanism that has been used for a manual transmission is used in electric vehicles. However, we have discovered that the synchromesh type of shifting mechanism has a defect that torque interruption that disconnects power to be transmitted to driving wheels in shifting is generated.

SUMMARY

The present disclosure proposes a method of controlling an electric vehicle transmission, which has a simple configuration basically using a synchromesh type of shifting mechanism to be used for an electric vehicle and may inhibit or prevent torque interruption, in which the method may more stably and reliably control downshift for shifting to lower gear step and improve shifting quality by allowing for quick and accurate shifting.

Accordingly, the present disclosure proposes a method of controlling an electric vehicle transmission that includes: a torque-securing step of securing predetermined spare torque to be generated by a motor in accordance with current motor torque when a controller determines that there is a need for downshift from an upper gear step to a lower gear step; a slip-controlling step of generating a friction force through a servo clutch provided for applying a friction force between an input shaft and a servo driving gear of a pair of servo gears having a gear ratio smaller than a gear ratio of the upper gear step by means of the controller; a shifting-to-neutral step of shifting to a neutral gear by disengaging a synchronizer for the upper gear step by means of the controller, after the slip-controlling step; a motor-synchronizing step of synchronizing a rotational speed of the motor with a desired speed of a lower gear step using the spare torque of the motor secured in the torque-securing step by means of the controller, after the shifting-to-neutral step; a gear-engaging step of engaging a synchronizer for the lower gear step by means of the controller, after the motor-synchronizing step; and a clutch-disengaging step of finishing shifting by disengaging the servo clutch by means of the controller, after the gear-engaging step.

The torque-securing step may include: a motor torque-determining step of determining whether the current motor torque is smaller by predetermined reserve torque than maximum torque of the motor; and a motor torque-reducing step of reducing the motor torque such that a difference between the maximum torque and the current motor torque becomes the spare torque or more, when it is determined that the difference between the maximum torque and the current motor torque is less than the spare torque in the motor torque-determining step.

The shifting-to-neutral step may be performed when torque that has been transmitted through the upper gear step is switched to the pair of servo gears by starting the slip-controlling step.

When the shifting-to-neutral step is performed, the slip-controlling step may maintain transmission torque of the servo clutch at a predetermined level.

The motor torque may be actively controlled with the transmission torque of the servo clutch maintained at a predetermined level in the motor-synchronizing step.

The slip-controlling step may be started simultaneously with the torque-securing step when the controller determines that there is a need for downshift.

According to the present disclosure, in an electric vehicle transmission that has a simple configuration basically using a synchromesh type of shifting mechanism to be used for an electric vehicle and may inhibit or prevent torque interruption, it is possible to more stably and reliably control downshift for shifting to lower gear steps and to improve shifting quality by allowing for quick and accurate shifting.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
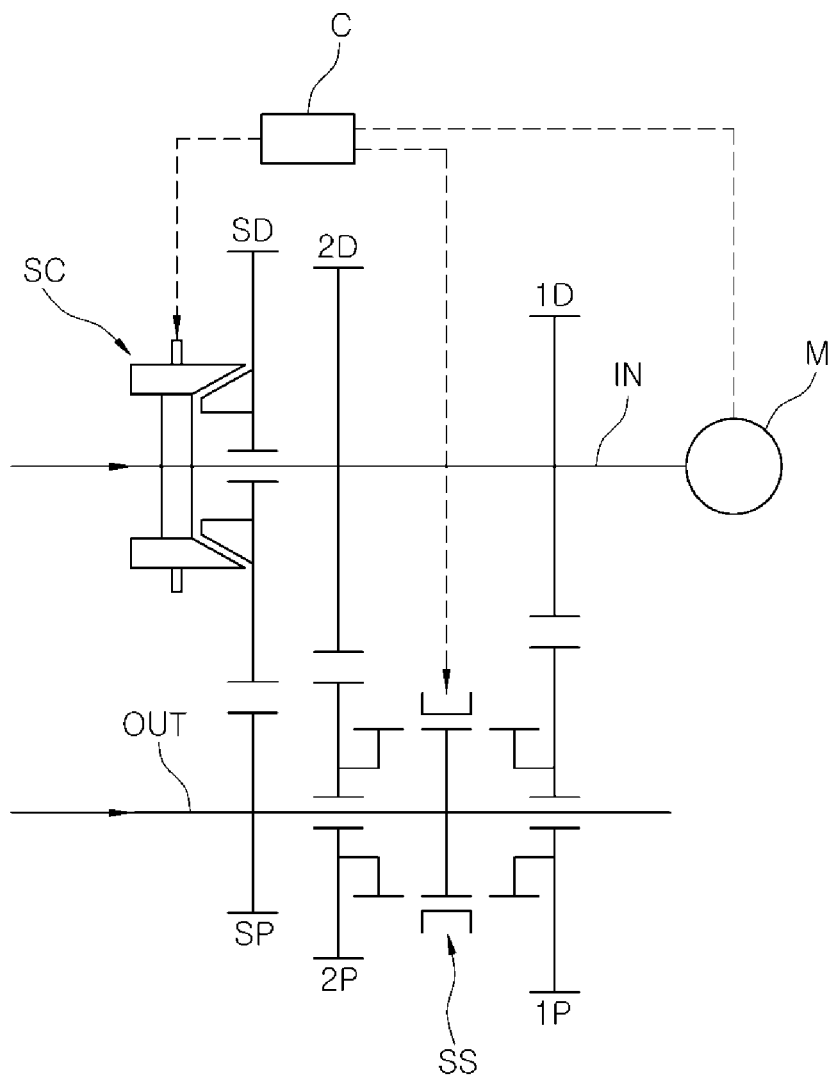
FIG. 1 is a diagram illustrating the configuration of an electric vehicle transmission to which the present disclosure can be applied.
Figure 4:
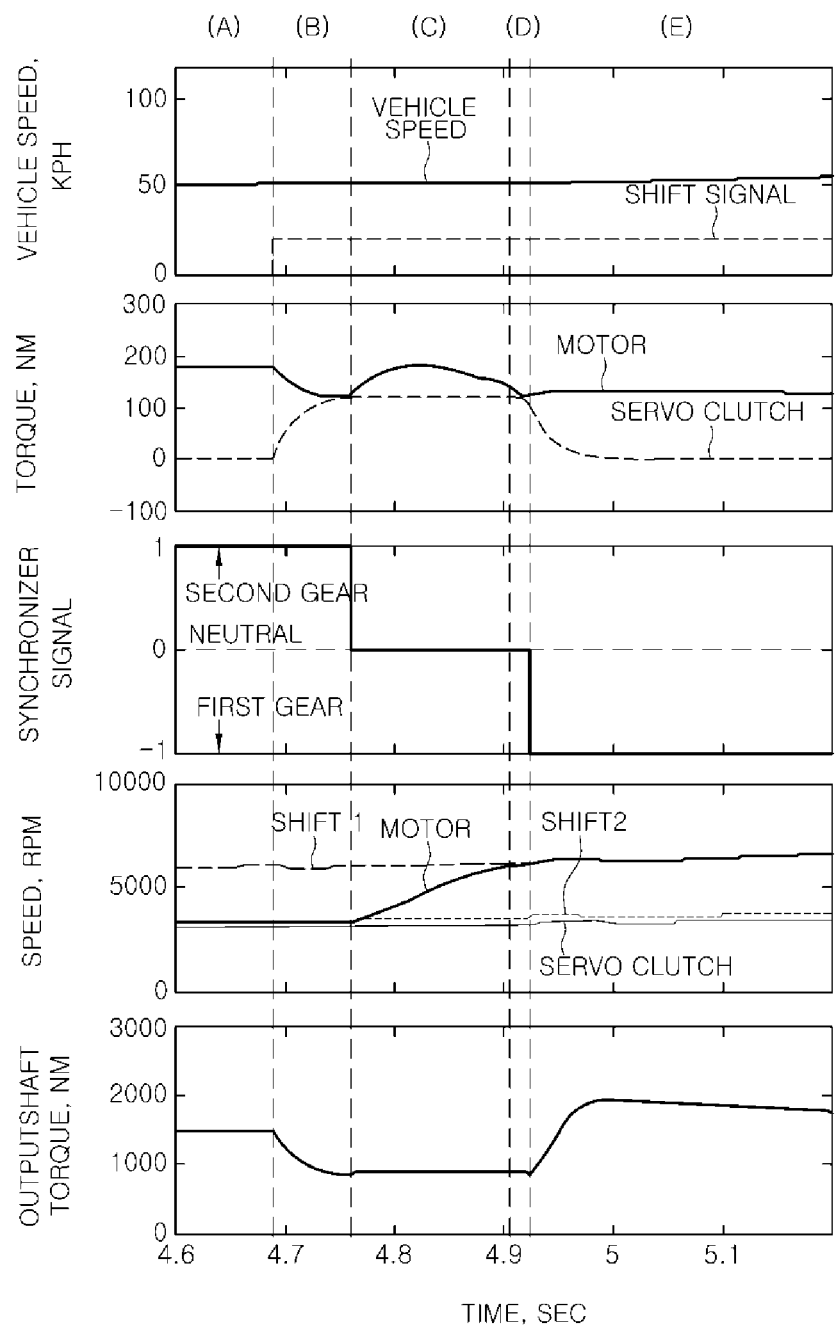

FIGS. 3A to 3E are diagrams sequentially illustrating a process of shifting by the transmission shown in FIG. 1 in accordance with the method of controlling an electric vehicle transmission of the present disclosure; and FIG. 4 is a graph illustrating a process of shifting by the transmission shown in FIG. 1 in accordance with the method of controlling an electric vehicle transmission of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an electric vehicle transmission includes: an input shaft IN receiving power from a motor M; a first driving gear 1D and a second driving gear 2D on the input shaft IN; an output shaft OUT parallel with the input shaft IN; a first driven gear 1P on the output shaft OUT for generating a first gear ratio by engaging with the first driving gear 1D and a second driven gear 2P on the output shaft for generating a second gear ratio by engaging with the second driving gear 2D; a synchronizer SS connecting/disconnecting the first driven gear 1P or the second driven gear 2P to/from the output shaft OUT; a servo driving gear SD rotatably fitted on the input shaft IN and a servo driven gear SP non-rotatably fitted on the output shaft OUT to generate a gear ratio smaller than the second gear ratio by engaging with the servo driving gear SD; and a servo clutch SC applying a friction force between the servo driving gear SD and the input shaft IN.

The servo driving gear SD and the servo driven gear SP make a pair of servo gears, which is described below.

The synchronizer SS may be composed of a first synchronizer for connecting/disconnecting the first driven gear 1P to/from the output shaft OUT and a second synchronizer for connecting/disconnecting the second driven gear 2P to/from the output shaft OUT, but a single synchronizer SS is configured to take charge of these functions in FIG. 1.

The servo clutch SC is a conical clutch so that a large friction force can be transmitted with the same volume.

The motor M, synchronizer SS, and servo clutch SC are controlled by a controller C.

For reference, an upper gear step means the second gear step and a lower gear step means the first gear step in the following description.

Figure 2:
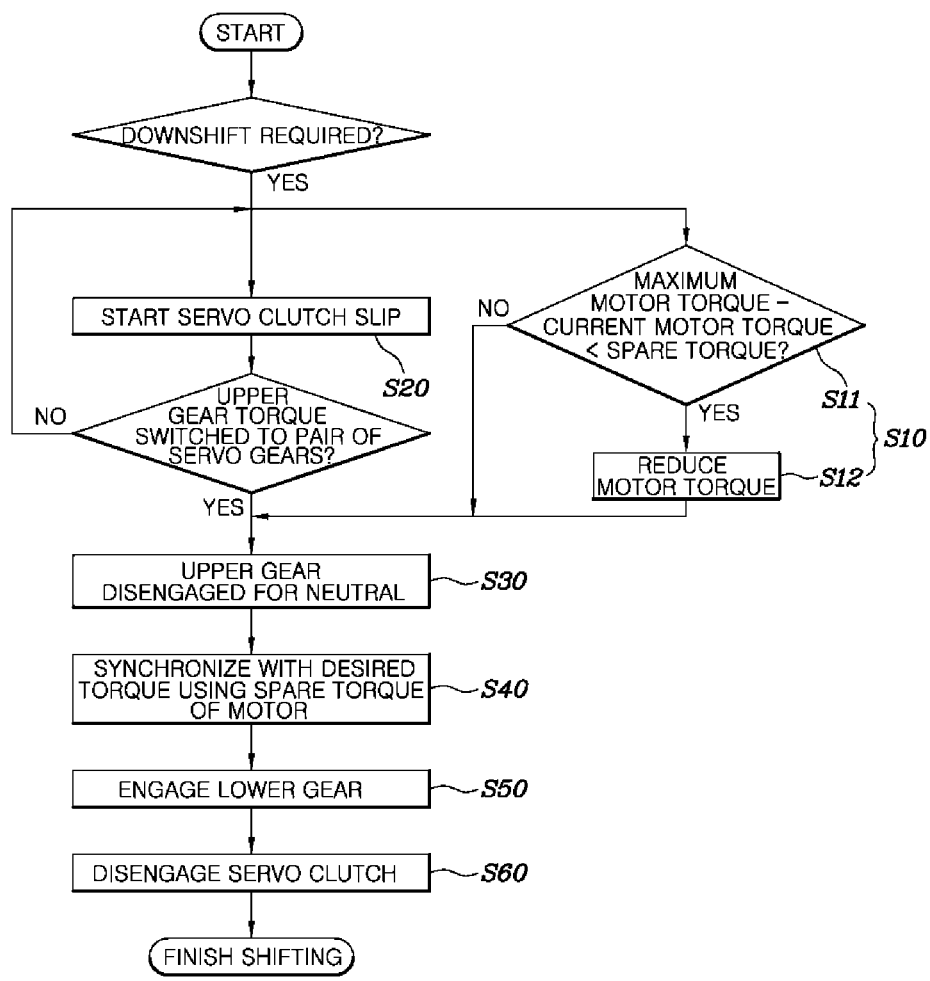
FIG. 2 is a flowchart illustrating one form of a method of controlling an electric vehicle transmission according to one form of the present disclosure.

Referring to FIGS. 2 to 4, a method of controlling an electric vehicle transmission includes: a torque-securing step of securing predetermined spare torque to be generated by a motor in accordance with the current motor torque when a controller C determines that there is a need for downshift from an upper gear step to a lower gear step (S10); a slip-controlling step of generating a friction force through a servo clutch provided for applying a friction force between an input shaft and a servo driving gear of a pair of servo gears having a gear ratio smaller than the gear ratio of the upper gear step by means of the controller (S20); a shifting-to-neutral step of shifting to a neutral gear by disengaging a synchronizer for the upper gear step by means of the controller (S30), after the slip-controlling step; a motor-synchronizing step of synchronizing the rotational speed of the motor with a desired speed of a lower gear step using the spare torque of the motor secured in the torque-securing step by means of the controller (S40), after the shifting-to-neutral step; a gear-engaging step of engaging a synchronizer for the lower gear step by means of the controller (S50), after the motor-synchronizing step; and a clutch-disengaging step of finishing shifting by disengaging the servo clutch SC by means of the controller C (S60), after the gear-engaging step (S50).

That is, according to the present disclosure, when it is desired to shift from an upper gear step to a lower gear step, the controller C finds out the current motor torque to secure the spare torque, the servo clutch generates a friction force in the slip-controlling step (S20), and the shifting-to-neutral step (S30) is performed to disengage the second gear step that is the upper gear step. Thereafter, the motor is actively controlled with the spare torque to be synchronized with a desired speed of the first gear step that is the lower gear step, a sleeve of the synchronizer is engaged with a clutch gear integrally provided with the first driven gear, and the servo clutch is disengaged; therefore, shifting is quickly and accurately finished.

The reason of quick and accurate shifting described above is because the torque and speed of the motor can be relatively easily and very accurately controlled and thus the motor can be actively synchronized with a desired speed in the motor-synchronizing step (S40) by the spare torque secured in the torque-securing step (S10).

Accordingly, the spare torque is set at a level for smoothly and quickly synchronizing the motor speed with the desired speed of the lower gear step by controlling the motor with the upper gear step disengaged for the neutral state, as described above. Further, the spare torque may be determined by several tests and analyses and may be set relatively large for more quick synchronization, depending on the intention of design.

The desired speed of the lower gear step means the speed of the motor that makes the clutch gear speed of the first driven gear of the first gear step that is the desired gear step in downshift from the second gear step to the first gear step be the same as the sleeve speed of the synchronizer. That is, the speed of the motor is controlled such that the clutch gear speed of the first driven gear is synchronized with the sleeve speed in the motor-synchronizing step (S40), and then the gear-engaging step (S50) is performed.

The torque-securing step (S10) includes a motor torque-determining step of determining whether the current motor torque is smaller by predetermined spare torque than the maximum torque of the motor (S11); and a motor torque-reducing step of reducing the motor torque such that the difference between the maximum torque and the current motor torque becomes the spare torque or more (S12), when it is determined that the difference between the maximum torque and the current motor torque is less than the spare torque in the motor torque-determining step.

Obviously, when it is determined that there is a spare over the spare torque from the current motor torque to the maximum torque of the motor in the motor torque-determining step (S11), the motor torque-reducing step (S12) is not performed.

When the controller determines that there is need for downshift, the slip-controlling step (S20), as shown in FIGS. 2 and 4, may be started with the torque-securing step (S10) so that shifting is performed as quickly as possible.

However, for easy control, the torque-securing step (S10) may be performed first and then the slip-controlling step (S20) may be started.

The slip-controlling step (S20) continues until the clutch-disengaging step (S60) is finished.

The shifting-to-neutral step (S30) is performed when torque that has been transmitted through the upper gear step is switched to the pair of servo gears by the slip-controlling step (S20).

That is, when the slip-controlling step (S20) is started, a friction force is generated between the servo driving gear and the input shaft and the torque that has been transmitted through the second driving gear and the second driven gear starts to be transmitted to the pair of servo gears, and as the friction force increases, the torque is transmitted not through the second driving gear and the second driven gear, but only through the pair of servo gears, and at this time, the shifting-to-neutral step is performed, thereby smoothly disengaging the second gear step without shock.

Obviously, in the section from disengaging the second gear step to engaging the first gear step, torque is continuously transmitted to the output shaft through the servo clutch and the pair of servo gears without torque interruption.

When the shifting-to-neutral step (S30) is performed, the slip-controlling step (S20) may maintain the torque transmitted through the servo clutch at a predetermined level so that the motor can be more easily controlled in the motor-synchronizing step (S40).

That is, in the motor-synchronizing step (S40), the motor is actively controlled with the transmission torque of the servo clutch SC maintained at a predetermined level, so the speed of the motor can be more accurately and easily controlled for synchronization.

As described above, when the speed of the motor is synchronized with the desired speed, the gear-engaging step (S50) is performed. Synchronization of the speed of the motor with the desired speed does not mean only that the clutch gear speed of the first driven gear is completely the same as the sleeve sped of the synchronizer, but includes an error within a range that the synchronizer can cope with. Actually, when the synchronization is finished with a speed difference within the range that the synchronizer can cope, it may be a way that can reduce the shifting time as much as possible to engage the first gear step by operating the synchronizer.

For reference, FIGS. 3A and (A) in FIG. 4 show a state when a vehicle is driven with the second gear step that is the upper gear step engaged, FIGS. 3B and (B) in FIG. 4 shows a state when the slip-controlling step is started and the torque-securing step is performed in which the servo clutch generates a friction force, FIGS. 3C and (C) in FIG. 4 show a state after the shifting-to-neutral step with the second gear step disengaged and the synchronizer at the neutral position, in which when the synchronizer is moved to the neutral position, the motor speed is synchronized with the desired speed of the first gear step by performing the motor-synchronizing step, and FIGS. 3D and (D) in FIG. 4 show the gear-engaging step of engaging the synchronizer with the first gear step, and FIGS. 3E and (E) in FIG. 4 show the clutch-disengaging step in which the servo clutch is disengaged.

For reference in FIG. 4, Shift 1 and Shift 2 mean the speeds of the first gear step and the second gear step, respectively.

According to the present disclosure, as described above, more quick and accurate downshift is achieved by actively controlling the speed of a motor, so the shifting quality of a vehicle is improved and accordingly the commercial value of an electric vehicle can be improved.

Although the present disclosure was described with reference to specific forms shown in the drawings, it is apparent to those skilled in the art that the present disclosure may be changed and modified in various ways without departing from the scope of the present disclosure.

What is claimed is:

1. A method of controlling an electric vehicle transmission, comprising:

a torque-securing step of securing a predetermined spare torque to be generated by a motor in accordance with a current motor torque when a controller determines that there is a need for downshift from an upper gear step to a lower gear step;

a slip-controlling step of generating a friction force through a servo clutch provided for applying a friction force between an input shaft and a servo driving gear of a pair of servo gears having a gear ratio smaller than a gear ratio of the upper gear step by means of the controller;

a shifting-to-neutral step of shifting to a neutral gear by disengaging a synchronizer for the upper gear step by means of the controller, after the slip-controlling step;

a motor-synchronizing step of synchronizing a rotational speed of the motor with a desired speed of a lower gear step using the predetermined spare torque of the motor secured in the torque-securing step by means of the controller, after the shifting-to-neutral step;

a gear-engaging step of engaging a synchronizer for the lower gear step by means of the controller, after the motor-synchronizing step; and a clutch-disengaging step of finishing shifting by disengaging the servo clutch by means of the controller, after the gear-engaging step.

2. The method of claim 1, wherein the torque-securing step includes:

a motor torque-determining step of determining whether the current motor torque is smaller by a predetermined reserve torque than a maximum torque of the motor; and a motor torque-reducing step of reducing the motor torque such that a difference between the maximum torque and the current motor torque becomes the predetermined spare torque or more, when the difference between the maximum torque and the current motor torque is determined as being less than the predetermined spare torque in the motor torque-determining step.

3. The method of claim 1, wherein the shifting-to-neutral step is performed when a torque that has been transmitted through the upper gear step is switched to the pair of servo gears by starting the slip-controlling step.

4. The method of claim 3, wherein when the shifting-to-neutral step is performed, the slip-controlling step maintains a transmission torque of the servo clutch at a predetermined level.

5. The method of claim 4, wherein the motor torque is actively controlled with the transmission torque of the servo clutch maintained at a predetermined level in the motor-synchronizing step.

6. The method of claim 1, wherein the slip-controlling step is started simultaneously with the torque-securing step when the controller determines that there is a need for downshift.

* * * * *